June 3, 1969     R. R. McCORNACK     3,447,559
ANTI-SIPHON BREAKER
Filed April 28, 1966

Inventor
Robert R. McCornack
By
Mann, Brown & McWilliams, Attys.

United States Patent Office 3,447,559
Patented June 3, 1969

3,447,559
ANTI-SIPHON BREAKER
Robert R. McCornack, Galesburg, Ill., assignor to Kewanee Valve Company, a corporation of Illinois
Filed Apr. 28, 1966, Ser. No. 546,050
Int. Cl. E03c 1/10
U.S. Cl. 137—218                            10 Claims

ABSTRACT OF THE DISCLOSURE

An anti-siphon valve member and assemblage utilizing a rubber element having depending lips forming a valve closure, which element uses an internal shoulder for snap-fitting engagement with a rigid, flanged and threaded member for arrangement and use in an outlet pipe construction for conventional or modified design.

---

Figures 1, 2:
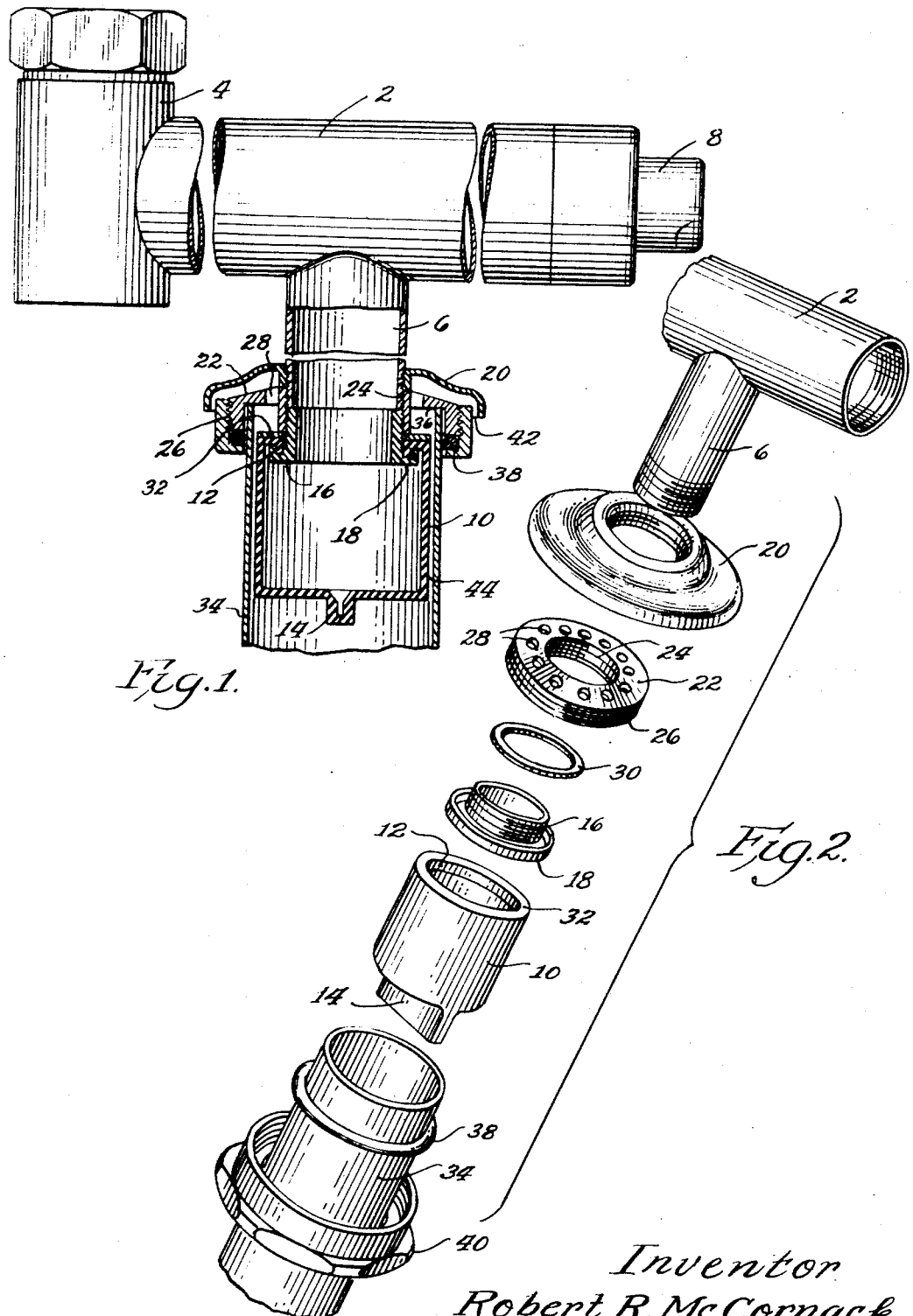

This invention relates to a vacuum breaker and valve construction utilized in fluid systems. More specifically this invention relates to an anti-siphon and valve construction for use with a fluid pipe outlet emanating from a main fluid valve. Even more specifically the invention pertains to a novel vacuum breaker and valve element which is readily utilizable in conjunction with commonly available pipe and conduit fittings.

In any fluid system as is commonly found in the normal lavatory facilities wherein a valve such as a flush valve assembly communicates to a supply line and to a drain line or other potential source of contamination, it is necessary to provide a one-way fluid valve or check in the drain line portion in order to prevent contamination of the main water supply should a vacuum be created in the supply side of the valve assembly. By the same token it is necessary to provide means to accomplish the prevention of contamination of water supply and to provide means to equalize the pressures within the fluid system so as to break a vacuum or siphoning effect in an economical manner. Thus it is important that any means be compatible for incorporation into and in conjunction with generally available pipe sizes and configurations.

It is therefore a primary object of this invention to provide a vacuum breaker and valve construction for utilization in the drain pipe of a fluid system.

It is another object of this invention to provide a vacuum breaker and valve construction which is of low manufacture cost and is easily utilized with commonly available and/or low cost conduits and conduit connectors.

It is still another object of this invention to provide a vacuum breaker and valve construction which does not necessitate the need of special pipe and conduit connectors of special or intricate configuration in order to provide adequate vacuum breaking and valving facilities.

Still a further object of this invention is to provide a simple low cost vacuum breaker and valve device for use with a flush valve drain pipe which is easily and quickly assembled and which does not necessitate the need for flanged couplings and/or other pipes or conduits of special high cost configuration.

These and other objects will become apparent in view of the following commentary taken in conjunction with the drawings wherein FIGURE 1 is a side elevational view partly in cross-section showing the novel vacuum breaker and valve construction in conjunction with an ordinary flush valve; and FIGURE 2 is an exploded view in perspective showing the method of assembling the novel vacuum breaker and valve construction into a valving assembly utilizing commonly ordinarily available piping.

Like numerals and characters indicate like parts throughout the drawings and referring specifically to FIGURE 1 there is depicted a normal or commonly employed flush valve 2 connected to a fluid supply pipe 4 and drain or outlet pipe 6. The flush valve assembly has a commonly employed push button activator 8 which allows fluid such as water to pass from fluid supply pipe 4 into drain or outlet pipe 6. Positioned slightly below main valve body 2 is the vacuum breaker and valve construction of this invention. Briefly, this construction comprises a flexible cylindrical element 10 fabricated of a resilient material such as rubber having an internal shoulder 12 at its uppermost portion and having a bottom or converging portion 14 forming two opposed parallel lips which provides an orifice for fluid to pass through the drain pipe 6 past the flexible valve element and hence to a sewer drain or other receiving facility. A substantially rigid element 16 which is removably insertable into the flexible cylindrical element 10 has an external receiving flange 18 to engage the internal shoulder portion 12 of the flexible element 10. The uppermost portion of support element 16 is threaded for engagement with the threaded internal surface 24 of element 22, as will be more readily apparent by referring to FIGURE 2.

It is readily apparent that the overall anti-siphon and valve construction is intended for use with a threaded outlet pipe 6 adapted to receive an annular skirt member 20 and a ring-like element 22 having threaded internal and external annular surfaces 24 and 26 respectively with spaced apertures 28 between these surfaces. The element 22 is secured to the threaded end of pipe 6 via the internal threaded annular surface 24 and is positioned in underlying relationship to skirt member 20. The substantially rigid supporting member 16 is inserted into the flexible member 10 so that the external flange 18 engages the shoulder portion 12 of flexible element 10. This provides a unitized valve and anti-siphon member which may then be threaded into the internal surface 24 of ring-like element 22. Preferably but not necessarily, a gasket 30 may be positioned around the external upper surface 32 of flexible element 10 to prevent flexible element 10 from coming into contact with any of the spaced apertures 28 of ring-like element 22. To complete the assembly a straight-run segment of pipe 34 of slightly larger diameter than flexible element 10 is positioned therearound and engages a recessed underside portion 36 (FIGURE 1) of ring-like element 22. O-ring 38 and coupling 40 threadably secured to the external threaded surface 26 of annular element 22 completes a fluid-tight assembly.

It is readily apparent that an anti-siphon and valve construction of unique configuration of low cost manufacture and of simple design has been disclosed which eliminates the necessity for using pipe connecting elements of complicated design entailing highly expensive machined or formed flanges and other supporting means for the anti-siphon and valve element in a fluid valve assembly. Briefly in operation it is readily apparent that the apertures 28 provide communication to the atmosphere via the space between the overlying skirt 20 and the ring-like element 22 through the space 42. Additionally, the fluid entering pipe 6 will flow downwardly therethrough and into flexible element 10 urging the walls thereof into fluid-tight engagement with the internal walls of drain pipe 34 thereby preventing the escape of fluids through the apertures 28 via the air space 44 between the side walls of flexible element 10 and the internal wall of drain pipe 34. The fluid will be allowed to pass through the flexible element 10 because of the opening provided between the two parallel lips 14 and thence through a proper disposal facility. Should a vacuum develop in the upper portion of drain pipe 6 or within the supply side of the valving assembly 2 waste water or fluid will be unable to pass through flexible element 10 because of the atmospheric pressure tending to push the parallel lips 14 towards one another. It is readily apparent that the invention may be modified by the exercise of ordinary skill without departing from the spirit of the invention. For instance, O-ring 38 and coupling 40 need not necessarily be employed to obtain fluid-tight engagement between drain pipe 34 and the remainder of the assembly in that a conduit with a formed coupling integral therewith could be used in its stead if cost were not considered an important factor.

It can now be seen that a simply constructed low cost vacuum breaker and valving device has been disclosed which is easily used with conventionally available piping and pipe connectors and wherein the flexible element made of rubber or similar material is not subjected to undue wear inasmuch as at no time does this flexible member come in contact with air vents such as 28 forming uneven surfaces through which the flexible element may bulge and incur erosion and wear.

As many possible embodiments may be made of the above-described invention and as many changes may be made in the embodiment above set forth it is to be understood that all matter hereinbefore set forth or shown in the accompanying drawing is to be interpreted as illustrative and not in a limiting sense.

The embodiments of the invention in which an exclusive property or privilege is claimed are defined as follows:

1. A vacuum breaker and valve construction comprising a flexible cylindrical element having a single internal shoulder at the uppermost portion thereof, said element having a bottom converging portion forming depending opposed parallel lips, said lips being normally biased to a closed position and a substantially rigid element removably insertable into said flexible cylindrical element having a single receiving external flange at one end for snap-fitting engagement with said internal shoulder, the other end of said rigid element extending axially beyond the uppermost end of said flexible element and being externally threaded for threadable engagement with an internally threaded apertured ring-like element, the internal threads of the ring-like element being adapted for threadable engagement with an outlet pipe independent of the pipe which encircles said flexible cylindrical element in the assembled form of a fluid valve assembly.

2. The construction in accordance with claim 1 wherein said flexible element has a bottom wall portion substantially parallel with said internal shoulder and said parallel lips are formed integral with said bottom wall and are substantially normal to the plane of said bottom.

3. The construction in accordance with claim 2 wherein said flexible element is of rubber and said substantially rigid element is of plastic.

4. An anti-siphon and valve construction for use with a threaded outlet pipe comprising an annular skirt member adapted to be threadedly secured on said pipe, a ring-like element having threaded internal and external annular surfaces with spaced apertures located therebetween and extending in an axial direction, said ring-like element adapted to threadedly engage said pipe with said internal threaded annular surface in underlying relation to said skirt member; a flexible valve and anti-siphon member supported on a substantially rigid member having a threaded end engaging the threaded internal surface of said ring-like element; said ring-like element adapted to threadedly engage in fluid-tight securement with its external threaded surface a drain pipe of slightly larger diameter than said flexible valve and anti-siphon member in encircling relationship therewith.

5. The construction in accordance with claim 4 wherein said flexible valve and anti-siphon member comprises a cylindrical element having an interior shoulder at its upper end for supporting engagement with said substantially rigid member and a lower end portion having converging wall portions providing a one-way fluid valve.

6. The construction in accordance with claim 5 wherein said apertures in said ring-like element are positioned to permit communication between the interior of said drain pipe and ambient atmosphere.

7. The construction in accordance with claim 6 wherein said ring-like element has a recessed bottom surface to receive said drain pipe and the external threads on said ring-like element are for securement of a threaded coupling therto, said coupling coacting with a sealing means on said drain pipe to form a fluid-tight connection with said outlet pipe.

8. The construction in accordance with claim 7 wherein said sealing means is an O-ring in encircling engagement with the exterior surface of said drain pipe.

9. The construction in accordance with claim 8 which additionally includes a washer element disposed on the exterior surface of said shoulder of said cylindrical element.

10. The construction in accordance with claim 9 wherein said cylindrical element is rubber and said substantially rigid member has a collar-like configuration having an outwardly extending flange for removably supporting engagement with said interior shoulder of said cylindrical element, said substantially rigid member being plastic.

References Cited
UNITED STATES PATENTS

| | | | |
|---|---|---|---|
| 803,979 | 11/1905 | Bonnell | 137—525.1 X |
| 2,270,737 | 1/1942 | Langdon | 137—525.1 X |
| 2,417,968 | 3/1947 | Browne | 137—525.1 |
| 2,594,525 | 4/1952 | Walden et al. | 137—525.1 |
| 2,598,002 | 5/1952 | Langdon | 137—218 |
| 3,125,114 | 3/1964 | Langdon | 137—218 |
| 3,334,646 | 8/1967 | Billeter et al. | 137—218 |

WILLIAM F. O'DEA, *Primary Examiner.*

D. H. LAMBERT, *Assistant Examiner.*

U.S. Cl. X.R.

137—525.1